United States Patent
Stanek et al.

[11] Patent Number: 5,911,812
[45] Date of Patent: Jun. 15, 1999

[54] BARBECUE GRILLE WITH FLUID RUNOFF CONTROL

[76] Inventors: Michael Stanek, 304 Paseo Pinto, San Clemente, Calif. 92672; Marian Bacinsky, 31291 Via Fajita, San Juan Capistrano, Calif. 92675

[21] Appl. No.: 09/172,585

[22] Filed: Oct. 14, 1998

[51] Int. Cl.⁶ .............................. A47J 37/00; A47J 37/06; A47J 37/07
[52] U.S. Cl. ................................ 99/446; 99/400; 99/444; 126/9 R; 126/25 R
[58] Field of Search ............................ 99/340, 375, 400, 99/425, 385, 444–446, 450; 126/25 R, 41 R, 9 R; 426/523

[56] References Cited

U.S. PATENT DOCUMENTS

| | | |
|---|---|---|
| 1,010,169 | 11/1911 | Noreck . |
| 1,795,523 | 3/1931 | Taylor ........................................ 99/446 |
| 1,956,387 | 4/1934 | Hartman .................................... 99/446 |
| 2,905,076 | 9/1959 | Del Francia .......................... 99/446 X |
| 3,092,015 | 6/1963 | Tucker et al. . |
| 3,183,823 | 5/1965 | Grimshaw . |
| 3,211,082 | 10/1965 | Sachnoff et al. ........................... 99/444 |
| 3,308,747 | 3/1967 | Spagnolo .............................. 99/446 X |
| 3,443,510 | 5/1969 | Norton . |
| 3,552,301 | 1/1971 | McNeff .................................. 126/25 R |
| 3,853,046 | 12/1974 | Pretorius .................................... 99/449 |
| 4,432,274 | 2/1984 | Kurotaki ..................................... 99/400 |
| 4,598,634 | 7/1986 | Van Horn, II . |
| 4,608,917 | 9/1986 | Faaborg .................................... 99/340 |
| 5,044,266 | 9/1991 | Geogaris . |
| 5,211,105 | 5/1993 | Liu ......................................... 126/9 R |
| 5,237,914 | 8/1993 | Carstensen . |
| 5,259,299 | 11/1993 | Ferraro ..................................... 99/340 |
| 5,363,752 | 11/1994 | Weil . |
| 5,445,066 | 8/1995 | Rossett ..................................... 99/446 |
| 5,546,851 | 8/1996 | Goto ..................................... 99/450 X |

*Primary Examiner*—Timothy F. Simone
*Attorney, Agent, or Firm*—Gene Scott-Patent Law & Venture Group

[57] ABSTRACT

A cooking grille has elongated slots for receiving heat from a barbecue below, and for directing fluids such as fat, basting sauces and meat juices. The cooking grille is placed upon a second collecting grille adapted for receiving the cooking grille in sliding engagement in a spaced apart relationship. The collecting grille provides conducting channels which are formed at an angle with the horizontal so as to move the fluids laterally for collection and to avoid their contact with hot portions of the cooking equipment. The upper cooking grille may be easily moved on the lower collecting grille so as to collect all of the fluid dripping from the cooking grille, only some of it, or none at all.

7 Claims, 3 Drawing Sheets

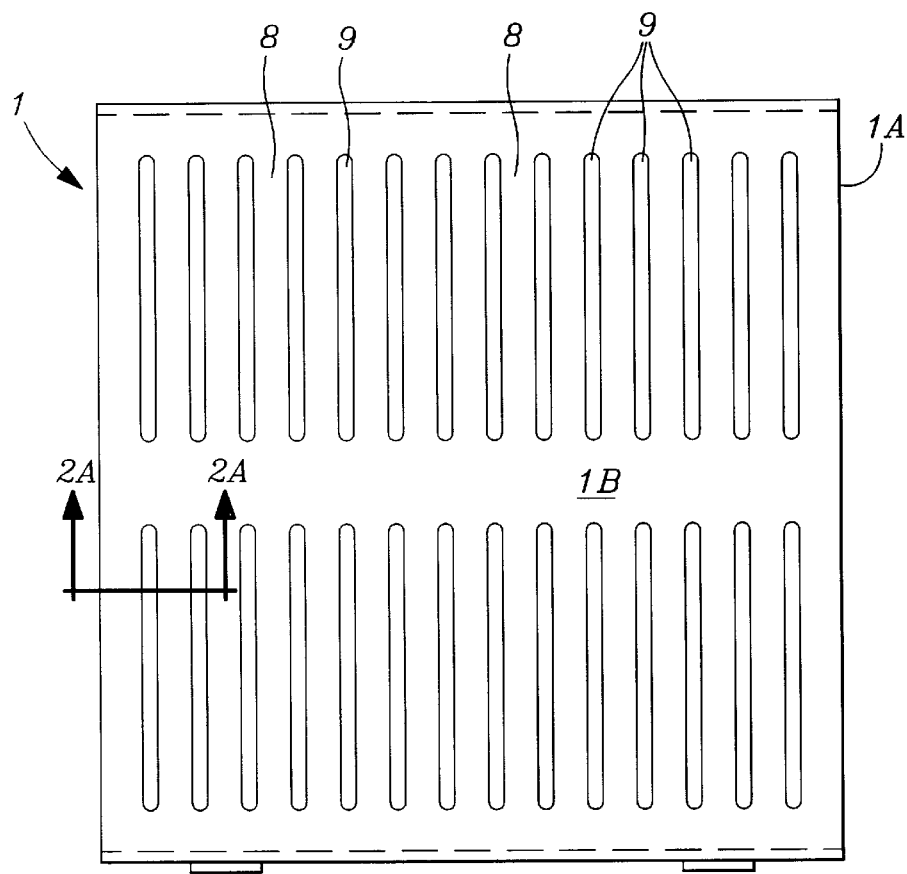
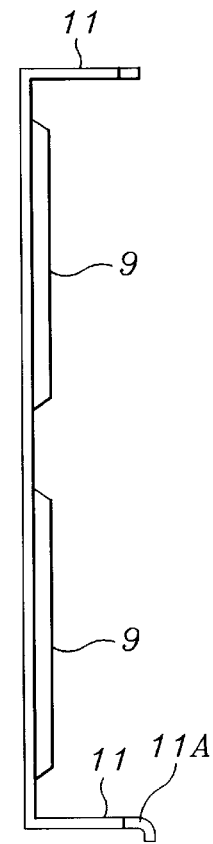
*Fig. 2*  *Fig. 3*
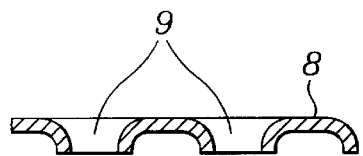
*Fig. 2A*

BARBECUE GRILLE WITH FLUID RUNOFF CONTROL

BACKGROUND OF THE INVENTION

1. Field of the Invention

This invention relates generally to barbecue grille assemblies, and more particularly to such an assembly having adjustability for controlling the amount of fat that may be allowed to drop into the flames of a cooker upon which the grille is placed.

2. Description of Related Art

The following art defines the present state of this field:

Van Horn, II, U.S. Pat. No. 4,598,634 describes a portable broiler and griddle apparatus which is placed on top of the burners on a cooking range to convert the range interchangeably into a broiler for flame broiling or a griddle for frying. The apparatus comprises a three-sided fire box within which rests interchangeably a broiling grid or a griddle on which the food is cooked. When the grid is in place for broiling, a removable base unit is placed underneath it to catch a substantial portion of the grease dripping from the broiling food. Both the grid and base have openings throughout which are staggered to allow a small portion of grease to drop down and ultimately reach the burners, to impart a charbroiled flavor to the food. The griddle, grid, and base are positioned at an angle to drain off grease into a removable attached grease cup at the front of the fire box.

Georgaris, U.S. Pat. No. 5,044,266 related to a barbecue grill and more specifically to a two-tiered barbecue grill system which uses water troughs strategically placed below the cooking surface so as to catch all of the melted fats thus preventing the grease from coming into direct contact with the hot coals below and causing undesirable flare-ups. Meats barbecued on conventional grills over charcoal have always resulted in troublesome flare-ups which burn and char the meat. These flare-ups have always proved difficult to contain, control, or eliminate. It is the primary object of my invention to provide a barbecue grill system that is capable of eliminating these undesirable flare-ups.

Weil, U.S. Pat. No. 5,363,752 describes a cooking grill for cooking over open flame having multiple parallel grids which are capable of displacement relative to each other, which the grids, comprised of channels which are offset from each other. The displacement of the grids and the offset of the channels controls the amount of flame which reaches foods placed upon a top grid.

Carstensen, U.S. Pat. No. 5,237,914 describes a cooking grill assembly adapted to be placed on the upper work surface of a barbecue heating unit. The grill assembly consists of two overlapping slotted plates, a grill component and an underlying drip pan component releasably hinged together along one margin. The slots are offset from each other in such a manner that the molten fat dripping downwardly through the slots of the upper grill plate will be intercepted by the underlying drip pan plate and conveyed to a fat accumulation trough on the latter. The arrangement is such that the smoke and other combustion vapors can rise upwardly through the slots of both grill components and flavor the meat in the usual manner, without danger of igniting the molten grease resulting from the cooking operation.

Norton, U.S. Pat. No. 3,443,510 describes a barbecuing device having a grill assembly comprised of an upper apertured grill member and a lower apertured grill member with the apertures of each member being misaligned with respect to each other whereby meat drippings that normally fall from the meat into the fire are caught by the lower grill member and transferred to a gravy saver reservoir. Heat, smoke, and radiant energy can pass upwardly through the grill, yet the meat drippings cannot pass downwardly through the entire grill assembly and accordingly combustion of the meat drippings is eliminated.

Tucker, et al., U.S. Pat. No. 3,092,015 relates to cooking utensils, and more particularly to that one utensil usually associated with outdoor cooking namely, the barbecue grill. The invention provides a barbecue grill that will capture the true flavor and aroma of the meat or fish that is being barbecued and return it to the same for the full enjoyment of all concerned. The invention also provides a barbecue grill that will capture the true flavor and aroma of whatever is being cooked on the same without reverting to a complicated structure expensive to manufacture and purchase. It also returns the heat and vapor from the food, by reason of it circulating through and around the trough and drip bars thus giving it, the food, the desired additional flavor and is easy to keep clean at all times, and with a minimum of effort. It is also adaptable to existing structures for holding the grill over the coals or fire and can be manufactured in any desired size and shape.

Grimshaw, U.S. Pat. No. 3,183,823 relates to cooking grills for food such as steaks, chops, and the like. The invention provides a grill which can be built up from bars and which can be cleaned easily. The grill is for use over a fire, and on which the deposit of grease is kept to a low level, the cooking operation being speedy and effective. According to this invention, there is provided an under-fired cooking grill, comprising a plurality of transverse bars each having an upper surface corrugated or ridged from front to rear, and a plurality of spaced apart projections formed so that a bar can be supported by the projections on the rear of a bar in front, said projections being arranged so that a plurality of small apertures is provided through the built-up grill, means for the support of said grill above a fire space being provided so that the bars slope down from front to rear. Conveniently the bars are supported at each end which ends are formed to cooperate with side supports, so that the grill slopes down from rear to front. Preferably, the upper surface of each bar is ridged or channeled from front to rear. The ridges of bars align so that a plurality of drainage channels is provided as the top surface, and these can lead to a collecting channel at the front of the grill. The bars are interlocked as a rigid structure, and mutually contact to give good head conduction. The front of each bar can be serrated or toothed and is cut away from end to end beneath the serrations. This provides the projections to rest on a bar in front and also a surface (below the projections) on which the rear edge of said front bar can bear, thereby securing good heat conductivity.

Noreck, U.S. Pat. No. 1,010,169 related to improvements in broilers in which the flame is directed at the same time from above and below toward the food to be broiled, and in which the grate and the lower bank of jets may be readily raised toward or lowered from the upper bank of gas jets. A broiler using gas fuel, broiling from above and below at one and the same time, without turning the meat to be broiled, in addition to these advantages admits of adjusting the broiler easily and quickly to all sizes and thicknesses of meat to be broiled, without removing or handling the hot grate, and without stepping or interfering with the operation of broiling.

The prior art teaches the use of double grilles, i.e., one above the other for the purposes of catching grease droppings to prevent flair-ups. However, the prior art does not teach that such a pair of grilles may be adapted to form a first cooking grille enabled for sliding contact with a runoff collecting grille to mutually align apertures in both grilles for advantageously controlling the flow of fluids from the cooking products. The present invention fulfills these needs and provides further related advantages as described in the following summary.

SUMMARY OF THE INVENTION

The present invention teaches certain benefits in construction and use which give rise to the objectives described below.

The present invention provides a flat cooking grille having elongated slots for receiving heat from a barbecue below and for dispensing fluids such as fat and meat juices. The cooking grille is placed upon a second collecting grille adapted for receiving the cooking grille in sliding engagement in a spaced apart relationship. The collecting grille provides conducting channels which are formed at an angle with the horizontal so as to move the fluids laterally for collection. The two grilles may be quickly adjusted to collect all of the fluid dripping from the cooking grille or only some of it.

A primary objective of the present invention is to provide a barbecue grille having advantages not taught by the prior art.

Other objectives include providing such a grille pair capable of preventing flame flair-ups so as to prevent burning or charring of meat, capable of evaporating meat juices below the cooking meat so as to impart added flavor to the meat, capable of controlled meat juice dripping so as to impart a charbroiled flavor, capable of improving heat distribution on the cooking surface, as well as a controlled higher temperature with respect to prior art grilles, capable of preventing any of the meat juices from dripping so as to assure that prior cooking flavors are not imparted into current cooking, capable of producing less smoke and absolutely no charred products which are thought to be adverse to human health.

Still other objectives include the elimination of drip pans or foil wrapping as well as the elimination of rotisserie heat-radiation back burners for eliminating flame flair-ups.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 2 is a top plan view of the cooking grille thereof;

FIG. 2A is a sectional view thereof taken along cutting plane 2A—2A in FIG. 2;

FIG. 3 is a side elevational view of the cooking grille thereof;

DETAILED DESCRIPTION OF THE INVENTION

Figure 1:
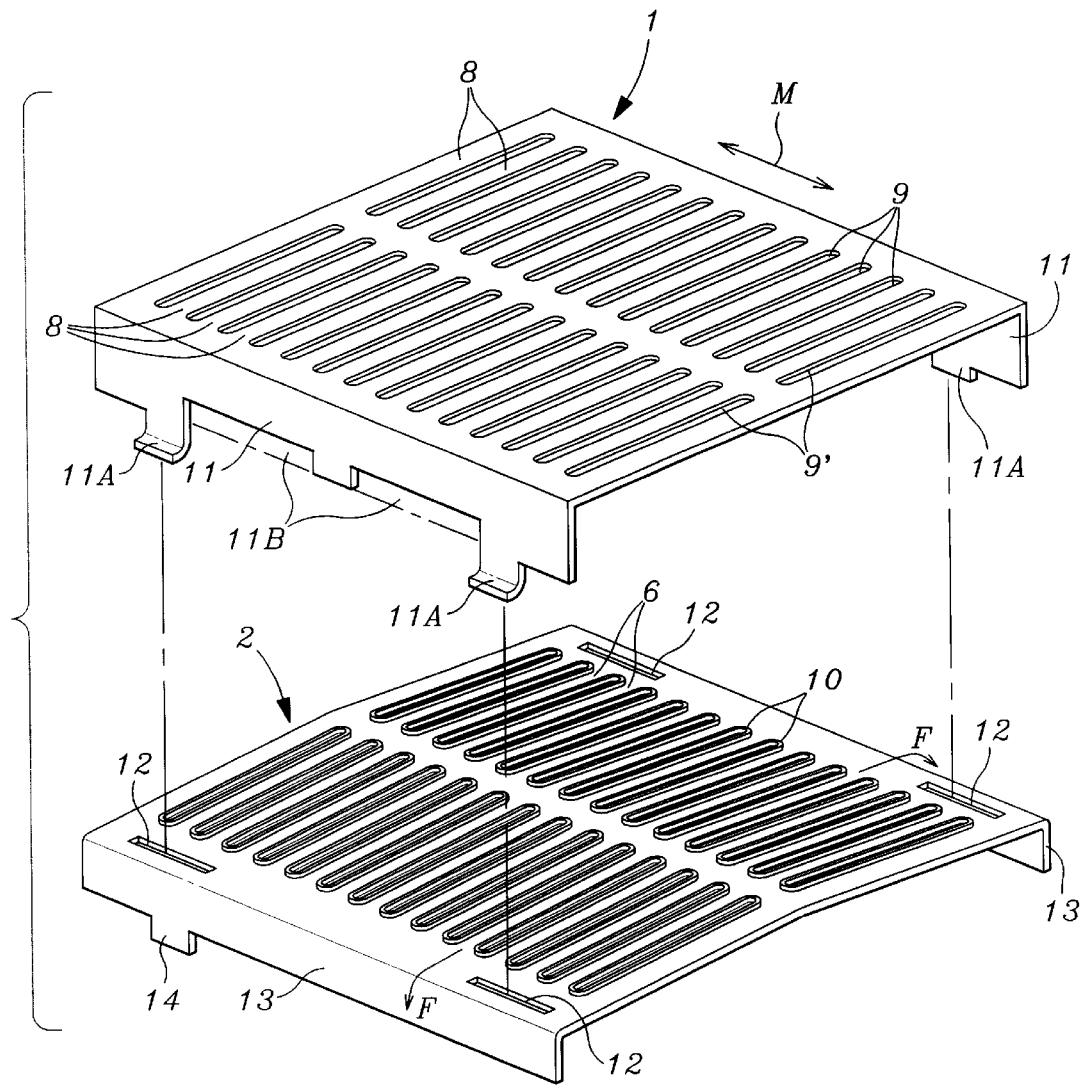
FIG. 1 is an exploded perspective view of the preferred embodiment of the present invention showing a cooking grille above a fluid collecting grille.
Figures 4, 5:
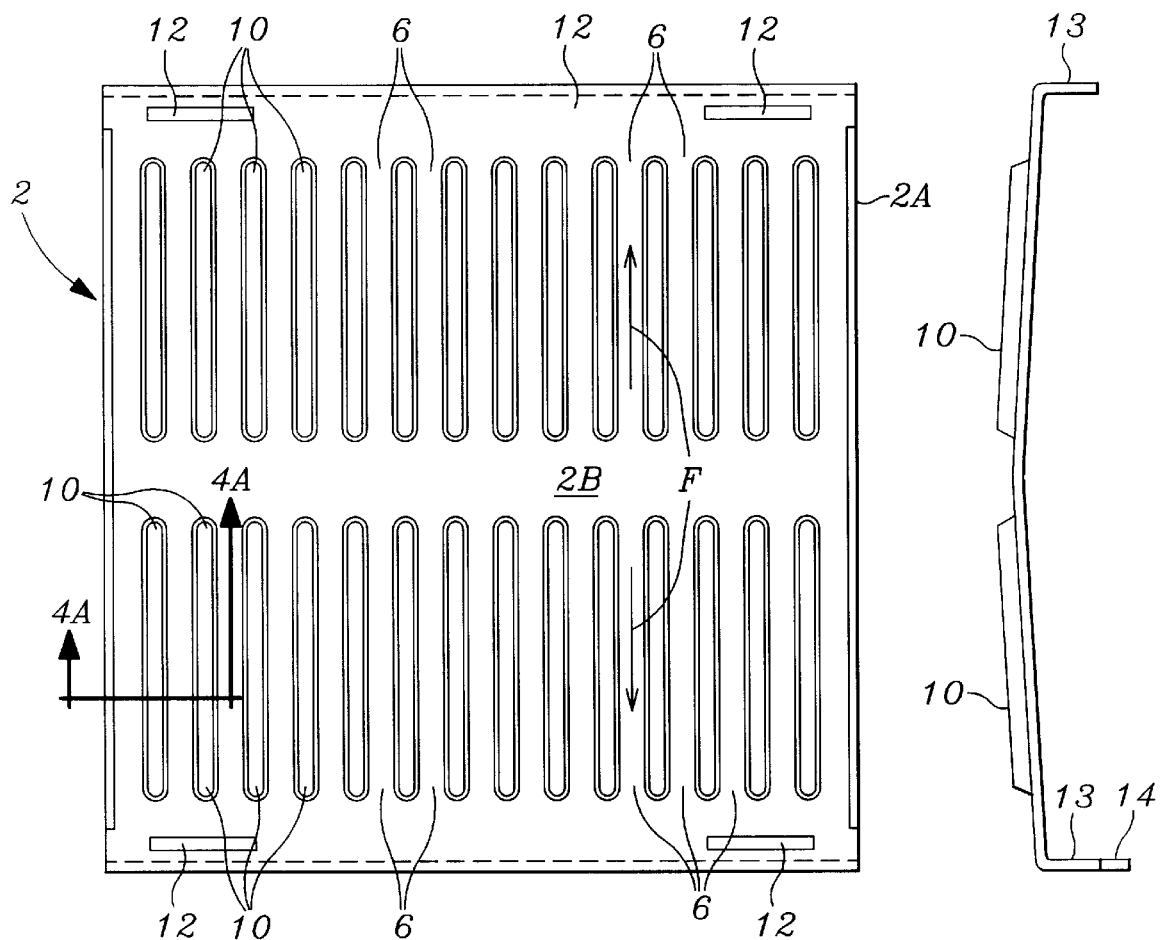
FIG. 4 is a top plan view of the collecting grille thereof.
FIG. 5 is a side elevational view of the collecting grille thereof.
Figure 4A:
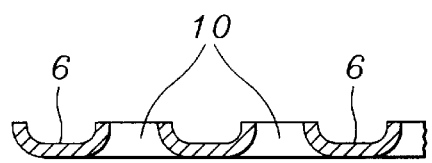
FIG. 4A is a sectional view thereof taken along cutting plane 4A—4A in FIG. 4.

The above described drawing figures illustrate the invention, a barbecue grille apparatus for use with a barbecue cooking equipment (not shown), the apparatus comprising a cooking grille 1 as shown in detail in FIGS. 2, 2A and 3, comprising a first generally flat plate 1A having an upwardly facing generally horizontally oriented surface 1B with a plurality of first apertures 9 therein. Preferably, the apertures are set in side-by-side rows of parallel elongate through slots with the material between the slots (webs) formed into convex surfaces. Such a flat plate 1A is easily made from metal sheet formed and cut by a stamping process, usually in a one-step process, however, the invention may be fabricated in an alternate manner and of other than sheet metal, as for instance by forging or casting processes. Stamping methods enable the drawing of the material downwardly as shown in FIG. 3 to form truncated vertical guide ways, part of apertures 9, as best seen in the sectional view 2A. A collecting grille 2 as shown in detail in FIGS. 4, 4A and 5, comprises a second plate 2A having an upwardly facing near-horizontally oriented surface 2B with a plurality of second apertures 10 therein arranged in correspondance with the first apertures 9 so that with the first plate 1 placed onto the second plate 2, the first 9 and the second apertures 10 may be mutually aligned, the upwardly facing near-horizontally oriented surface 2B further providing a plurality of fluid directing channels 6 therein, the fluid directing channels 6 being arranged for corresponding with the first apertures 9 so that with the first plate 1 placed onto the second plate 2, the first apertures 9 and the fluid directing channels 6 may be mutually aligned. Such a second plate 2A is easily made from metal sheet formed and cut by a stamping process as with flat plate 1A. Such a process is able to draw the material upwardly as best shown in FIG. 4A to form the fluid directing channels 6 between the second apertures 10 as best seen in the sectional view 2A. Alternate fabrication methods and materials may be used as described for flat plate 1A. A first standoff means 11, preferably a pair of opposing and laterally positioned elongate flanges or side panels are preferably formed, as shown in FIG. 1 lateral to the flat plate 1A, for engaging a receiver means 12, preferably pairs, on each side, of opposing and linearly aligned elongate slots adapted, by their size and position, for receiving corresponding tabs 11A formed at the lower edge of the first standoff means 11 such that with the tabs 11A engaged with the receiver means 12, the first plate 1A is supported above the second plate 2A and spaced therefrom so as to enable the cooking grille 1 to slide relative to the collecting grille 2. In that the slots 12 are longer than the tabs 11A are wide, said movement, see arrow "M" in FIG. 1, enables the first apertures 9 to be selectively positioned over the second apertures 10 or over the fluid directing channels 6 which are formed between the second apertures 10 as shown. It is very important to note that the relative movement between the grilles is adapted to enable selective coupling between the apertures and between the apertures and the fluid channels, that is, said motion is in a direction "M" at right angles to the long axis of both the apertures and the channels. Tabs 11A, on one side of cooking grille 1 may be formed with a curved terminal tab end so as to provide a locking action within slots 12 and to allow the cooking grille 1 to be hinged upwardly about the curved terminal tabs for obtaining access to the collecting grille 2 without fully removing the cooking grille 1.

Figure 6:
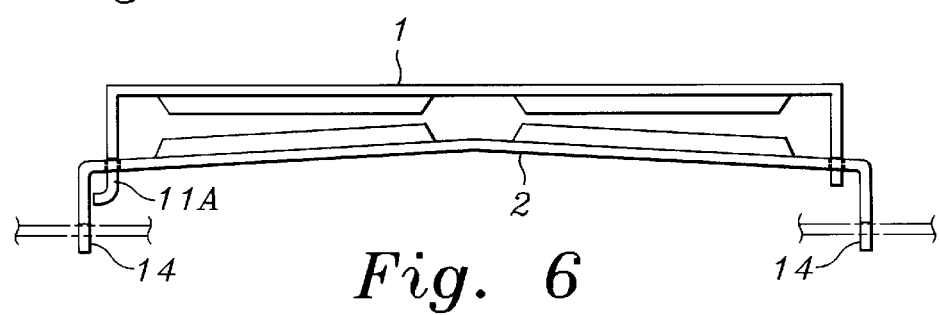
FIG. 6 is a side elevational view of the cooking and collecting grilles as used on a barbecue cooking equipment.

The collecting grille 2 may be adapted to provide a second standoff means 13 for being placed onto the barbecue cooking equipment or mounted securely by fasteners, to it. As shown in FIG. 6, in the preferred embodiment, the invention may be simply placed on top of an existing grille, so as to receive cooking heat from below or the invention may provide one or more grille tabs 14 (FIG. 1) of such size as to fit into openings in common grille surfaces (part of the cooking equipment) so as to prevent the invention from moving on such common grille surfaces. It should be clear from the above description and the figures that the relative positions of the cooking grille 1 and the collecting grille 2 may be arranged for passing fluid (not shown), i.e., meat drippings, basting sauces or defrost water, which falls through the first apertures 9 into and through the corresponding second apertures 10 and thus into the fire, and may be alternately arranged for passing said fluid to the fluid directing channels 6, and may also be arranged for passing said fluid partially through the second apertures 10 and partly into the fluid directing channels 6 as desired by the cook for the type of cooking appropriate to the food being prepared. Because the collecting grille is not horizontal, i.e., angled as shown in FIG. 5, the fluid caught by the channels 6 is directed, by gravity, laterally to move away from the hottest part of the collecting grille so as to be collected at the side or sides of the collecting grille or to simply move into the fire well to be collected in a conventional fat collecting container.

Preferably, the first apertures 9 and the second apertures 10 each comprise at least one series of spaced apart and parallel elongated slots separated by interslot webs, the metal between the adjacent slots on each grille, identified in the figures by numerals 8 and 6 respectively. As shown, the interslot webs 8 of the surface of the first plate 1A are convex in shape to assure that drippings are conducted into the first apertures 9, while the interslot webs 6 of the surface of the second plate 2A are concave so as to enable capture and conduction of fluid therein. It is seen in the figures that the fluid is conducted longitudinally along the channels 6, i.e., so as to move the fluid toward the first standoff means 13, and from there to drip downwardly for collection. Preferably, portions of first standoff 11 are cut-away, as shown by reference 11B in FIG. 1, so as to allow the fluids to move laterally over the exterior of second standoff 13. See arrows "F" in FIGS. 1 and 4.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A barbecue grille apparatus for use with a barbecue cooking equipment, the apparatus comprising:

a cooking grille comprising a first generally flat plate having an upwardly facing, generally horizontally oriented surface with a plurality of first apertures therein;

a collecting grille comprising a second plate having an upwardly facing near-horizontally oriented surface with a plurality of second apertures therein arranged for corresponding with the first apertures so that with the first plate placed onto the second plate, the first and the second apertures may be mutually aligned, the upwardly facing near-horizontally oriented surface further providing a plurality of fluid directing channels thereon, the fluid directing channels being arranged for corresponding with the first apertures so that with the first plate placed onto the second plate, the first apertures and the fluid directing channels may be mutually aligned;

a standoff means adapted for supporting the cooking grille on the collecting grille in spaced apart relationship;

a receiver means adapted for engaging the standoff means for operably enabling the cooking grille to slide on the collecting grille for selective positioning of the first apertures relative to the second apertures;

whereby, the relative positions of the cooking grille and the collecting grille may be arranged for passing fluid falling through the first apertures through the second apertures and may be alternately arranged for passing said fluid to the fluid directing channels, and may be alternately be arranged for passing said fluid partially through the second apertures and partly into the fluid directing channels.

2. The apparatus of claim 1 wherein the first apertures and the second apertures each comprise at least one series of spaced apart and parallel elongated slots separated by interslot webs.

3. The apparatus of claim 2 wherein the interslot webs of the surface of the first plate are convex so as to enable capture and conduction of fluid into the first apertures.

4. The apparatus of claim 2 wherein the interslot webs of the surface of the second plate are concave so as to enable capture and conduction of fluid therein.

5. The apparatus of claim 1 wherein the first standoff means comprises a pair of opposing and laterally positioned elongate flanges extending downwardly from the cooking grille.

6. The apparatus of claim 5 wherein the receiver means comprises two opposing pairs of laterally positioned elongate slots adapted for receiving a tab means of the first standoff means so as to enable the cooking grille to move relative to the collecting grille, said movement enabling the first apertures to be selectively positioned with respect to the second apertures and the fluid directing channels.

7. The apparatus of claim 6 wherein the tab means provides a curved terminal portion for enabling the cooking grille to rotate about the collecting grille for providing access to the collecting grille.

* * * * *